Patented May 15, 1945

2,376,308

UNITED STATES PATENT OFFICE 2,376,308 p-CYMENE FROM MONOCYCLIC TERPENES

James Kenneth Dixon, Riverside, Conn., assignor to American Cyanamid Company, New York, N. Y., a corporation of Maine No Drawing. Application January 9, 1943, Serial No. 471,875

7 Claims. (Cl. 260—668)

This invention relates to the catalytic dehydrogenation of monocyclic terpenes. More particularly the invention relates to the production of p-cymene by the vapor phase dehydrogenation of such monocyclic terpenes as dipentene, limonene, terpinolenes, terpinenes and the like in the presence of chromium oxide-on-alumina.

Due to the industrial importance of the styrenes, cymene as an intermediate in their production from terpenes has also become of increasing importance. Although p-cymene can theoretically be prepared from a monocyclic terpene by dehydrogenation, heat alone can not be made to yield satisfactory results. Consequently, considerable work has been done on the development of catalytic methods for carrying out the reaction. Because of its adaptability to continuous production on a large scale, catalytic dehydrogenation in the vapor phase has received particular attention. Unfortunately, while the process is desirable from a procedural point of view, its practice has been subject to a number of drawbacks which have prevented its commercial development.

The principal difficulty encountered in utilizing the process has been in the development of a suitable catalyst. The reaction has been carried out with only a slight degree of success making use of such catalysts as fuller's-earth, kieselguhr, activated carbon and aluminum oxide. The best results were obtained using temperatures of from about 100–200° C. in the liquid phase and from about 250–325° C. in the vapor phase. However, these catalysts appeared to be too inactive at these temperatures and the conversions were too low for commercial development.

When attempts were made to use higher operating temperatures the final results were poor. While it might be supposed that the conversion to cymene could be improved by raising the temperature, actually the extent to which cracking occurred was found to increase even faster. On raising the temperature the actual production of cymene was found to decrease, whereas the production of side reaction products such as toluene, ethyl toluene and menthane increased. In some cases considerable isoprene was found. As a result, the prior art taught that temperatures above about 300–325° C. could not be safely used.

Nor did attempts to use more active types of dehydrogenation catalysts provide an acceptable solution to the difficulty. Metallic nickel or copper for example, are too active and in producing p-cymene must be used at low temperatures in order to avoid excessive cracking and tar formation. Metallic catalysts of these types, as well as the easily reducible oxides are particularly troublesome in that they tend to crack off the isopropyl group. The difficultly-reducible metal oxides are too inactive at these low temperatures to be useful.

Many catalysts were found to produce a high yield of p-menthane. This latter objection is particularly unfortunate since once the production of p-menthane in appreciable quantities occurs, the equilibrium conditions are such that it is exceedingly difficult to completely dehydrogenate to cymene unless excessive contact times are employed which also tend to increase the losses of desirable products by cracking.

Based on these experiences, the art believed that it was necessary to find a catalyst which would not only give a good conversion without a disproportionate yield of p-menthane, but that it must also find a catalyst which would be active at temperatures low enough to obviate cracking difficulties. As a result of research along these lines, one solution was recently presented in the form of a finely divided palladium metal catalyst on several surface-active supports such as activated carbon and alumina. Conversions of over 95%, based on the material fed, were claimed for a process using these catalytic masses at temperatures of about 260–275° C. The products so obtained were particularly low in p-menthane content.

While superficially these catalysts appeared to be an excellent solution to the existing problem, actually they are subject to a number of drawbacks from the point of view of commercial development. A number of materials tend to quickly poison the catalyst. Consequently, while high conversions can be obtained it is necessary to feed a material of high purity in order to prevent undue shortening of the active life of the catalyst. Also, from an industrial point of view, these palladium metal catalysts are excessively expensive. This is particularly true when they are to be used in producing bulk materials which must be sold at a relatively low price. In addition to their initial high cost, it was also found that these catalysts could not be readily reactivated without resorting to expensive procedures.

There remained, therefore, a demand for a process using a suitable catalyst which would give a good cymene yield, low in p-menthane content without producing an undue amount of cracking, either of the material fed or of the intermediate products. At the same time, the catalyst should be one which can be relatively cheaply produced, will have a long active life and can be readily reactivated. It is, therefore, an object of the present invention to develop such a catalyst and a process by which it can be utilized.

In general the object of the present invention is accomplished by carrying out a vapor phase dehydrogenation using a chromium oxide supported on alumina as a catalyst. Contrary to the teachings of the prior art it was not only found unnecessary, but impractical, to use a reaction temperature under 300° C. Reaction temperatures as much as 200–250° C. above those previously used were found to be practical. Good conversions of 90% or better, of which as high as 75–80% can be isolated as cymene are readily obtained. The product is of high quality, being low in menthane and low in side reaction products produced by cracking.

In carrying out the process of the present invention, the source of the starting material is found to be relatively unimportant. Dipentene, which is available in commercially acceptable quantities was found to give excellent results. Other monocyclic terpenes such as terpinolene and the terpinenes may also be used. Nor is it necessary that the monocyclic terpene be in a pure form. Considerable quantities of bicyclic terpenes may be present without adversely affecting the process. If so desired, bicyclic terpenes, such for example, as $\alpha$-pinene may be readily isomerized to a mixture comprising essentially monocyclic terpenes and the mixture may be used as starting material for the present process.

Nor is the process of the present invention restricted to the use of any particular apparatus. The material to be treated must be vaporized and passed through the reaction vessel at a rate dependent upon the amount of catalytic mass being used. The reaction products may be collected by condensation and separated into their respective elements by fractional distillation. So long as these functions are performed, the design and exact structure of the apparatus may be varied almost at will. The development work was carried out using stainless steel reaction vessels. However, any material which is catalytically inactive, does not contaminate the materials and is resistant to intergranular attack by the hydrogen liberated during the reaction may be used.

As pointed out above, contrary to the teaching of the prior art, it has been found that in using a suitable catalyst, such as the chromium oxide-on-alumina of the present invention, it is not necessary that the reaction be carried out at low temperatures. While fair results have been obtained in the present process using temperatures as low as about 350° C. it is preferable to use a temperature of at least 400° C., whereas the prior art taught that a maximum temperature of about 300–325° C. should not be exceeded in any case.

Preferably, the temperature at which the reaction of the present invention is carried out should not appreciably exceed about 500° C. although acceptable results may be obtained at temperatures as high as 600° C. Much of the development work was carried out using temperatures of from about 400–500° C. and indicated that the optimum occurs at about 425–475° C. The precise optimum temperature for a particular case will vary somewhat, depending upon both the feed rate and the volume of catalyst used. However, the optimum temperature for any particular set of conditions can be readily determined.

In carrying out the process of the present invention it has been found important to control the temperature at which the vaporized material is brought into contact with the catalytic mass. This may be carried out by pre-heating the vapors to the temperature of the catalyst at the point of entrance to the reaction chamber. By so doing, a much more efficient use of the catalytic body may be made. If this is not done a considerable volume of catalyst is prevented from performing useful work by being utilized in heating the vapors passing therethrough to a temperature at which the reaction rates are effective. In addition, cracking, with its concomitant loss in yield and increased accumulation of tarry products which shorten the operating cycle, is favored by overheating of the terpene at the walls of the conversion chamber.

In preparing a catalyst for use in the present invention several considerations should be noted. The nature of the support upon which the chromium oxide is deposited appears to affect the activity of the catalytic mass as a whole. While satisfactory results have been obtained using alumina or bauxite as a support, it has been found that better results were obtained using the "Activated Alumina" of commerce. The so-called "Activated Alumina" may be prepared in a number of different ways, examples of which are well illustrated in U. S. Patents 1,868,869 and 2,015,593. While otherwise satisfactory, supports containing oxides of aluminum in conjunction with oxides of the alkali and alkaline-earth metals as in the case of clays such as kaolin and the like, tend to promote excessive cracking and should therefore be avoided. The presence of silica appears to exhibit the same tendency but to a lesser degree.

The chromium oxide content of the catalytic mass may be varied within quite wide limits. Satisfactory results have been obtained using as little as 2% and as much as 15% of the total weight as chromium oxide. Under the average conditions used in developing the process of the present invention, excellent results were obtained with chromium oxide content of approximately 10% in the catalytic mass. The exact optimum may vary in accordance with the temperatures and space-velocity to be used. For practical purposes, however, this was found to be relatively unimportant. It was also found that small amounts of other difficulty reducible oxides, such for example as the oxides of tungsten, uranium and molybdenum, appeared to improve the activity of the catalyst mass. Amounts of those additional oxides up to about 10% of the weight of $Cr_2O_3$ were found to be useful.

Preparation of the catalyst is quite simple, being readily carried out by impregnating the support with a solution of a soluble chromium-bearing compound capable of being converted to $Cr_2O_3$. This may be done for example by using a soluble chromium salt, such as the nitrate, and slowly heating the mass to decompose the salt to the oxide. Preferably the mass is finally heated in the presence of hydrogen to insure a complete reduction. Other means of reduction, such as with alcohol may be used if so desired. Preferably the oxide is finally heated slowly in the presence of nitrogen or hydrogen to the operating temperature in order to stabilize it.

While a usable catalyst can be made by depositing all the chromium salt in a single deposition, it has been found that catalysts so made do not have the chromium oxide properly distributed with respect to the alumina. This improper preparation has an adverse effect on cymene production and promotes cracking. However, it may be obviated by depositing the chromium salt in several steps, drying the solid between each deposition. This procedure, however, is more fully set forth in my copending application with D. J. Salley, entitled "Multiple-deposition catalysts," Serial No. 543,966, filed July 7, 1944. When additional components such as the auxiliary metal oxides mentioned above are used, they can be readily employed in the form of a soluble, reducible derivative along with the chromium-bearing material.

A particular advantage of the catalyst of the present invention, in addition to its relative cheapness, ruggedness and ease of preparation is that it can be readily reactivated. In continuous operation, no appreciable decrease in catalytic activity was noted after as many as 35 to 40 cycles. Reactivation was readily carried out by heating the mass while passing air over it. Care should be taken, however, to maintain the temperature below that at which the support will sinter. With activated alumina, for example, it is well to keep the reactivating temperature below about 800° C. This can be readily done by regulating the flow of air during reactivation.

The time of contact between the vaporized material and the catalyst is not particularly critical. This is an important advantage of the present process. As was pointed out above, many catalysts required excessively high space velocities in order to prevent cracking. With the catalyst and temperature ranges of the present process, a time of contact of as little as 2 and as high as 20 or more seconds may be used. However, for the best results, it has been found well to maintain a time of contact of about 5–10 seconds.

Another particular advantage of the process of the present invention is that because the space velocity need not be very high the use of a diluent gas is not required. With many of the catalysts which have been tried in the past it has been necessary to dilute the vapors with an inert gas such as nitrogen in order to control the reaction. This not only added to the difficulty by necessitating an additional control, but decreased the productivity of any fixed apparatus. Using the catalyst and temperature ranges of the present process, such a procedure is found to be not only unnecessary, but objectionable because of the loss in capacity of the apparatus.

The invention will be described in greater detail in conjunction with the following specific examples which are meant to be merely illustrative and do not in any way limit the invention.

Example 1

A series of 35 cycles was carried out using a dehydrogenation cycle of about 5 hours and a reactivating cycle of about 1 hour. A catalyst mass of about 1000 cc. of 10% $Cr_2O_3$ on "Activated" Alumina maintained at about 425–475° C. during dehydrogenation was used. Redistilled dipentene, having a refractive index of $N_D^{20}$ of 1.4732, was fed to the apparatus at a substantially constant rate of about 4700 cc. over a 5 hour period. During the reactivation cycle air was blown over the catalyst at a substantially constant rate of about 6000 cc./min. The feed material was vaporized at about 200–300° C. and pre-heated to about 450° C. before being passed over the catalyst. A gas evolution rate averaging about 5–7 cu.ft./hr. was observed. The products were collected by condensation and subjected to analysis by fractional distillation. The results are shown in the following table:

Table I (1) Gas composition:
   85–90% $H_2$, 5% olefins, 5–10% saturated hydrocarbons.
(2) Material recovery in dehydrogenation: about 95%.
(3) Composition of product:
   1–3% low boilers; 5–10% p-menthane; less than 2% dipentene; 75–80% cymene; 5–10% α,4-dimethyl styrene; 1–2% residue.

The principal low boiling constituents were found to be toluene and ethyl toluene. Although the average yield contained only about 75–80% of cymene per se, the p-menthane and α,4-dimethyl styrene content indicated a conversion of from 85–90% based on the material fed.

Example 2

In order to show the effect of varying the feed rate and therefore the contact time for a particular catalyst mass, a number of tests were made using 2000 cc. of a 10% $Cr_2O_3$ on "Activated" Alumina catalyst and an average catalyst temperature of about 450° C. The feed rate was varied from 10 to 30 cc./min. The dipentene was similar to that used in Example 1. An average cycle of about 5 hours dehydrogenation and about 45 minutes reactivation, passing air over the catalyst at the constant rate of about 10 l./min. were used. Representative results are shown in Table II.

Table II

| Average feed rate, cc./min. | Average composition of product, per cent weight | | | | | |
|---|---|---|---|---|---|---|
| | Toluene | Ethyl toluene | Menthane | Dipentene | Cymene | Dimethylstyrene |
| 10 | 3.6 | 6.9 | 7.8 | 2.3 | 74.3 | 5.1 |
| 14 | 2.8 | 6.2 | 8.0 | 1.6 | 76.2 | 5.2 |
| 15 | 1.3 | 5.3 | 10.0 | 0.3 | 77.8 | 4.4 |
| 30 | 2.1 | 6.8 | 12.0 | 1.9 | 71.8 | 5.4 |

It will be noted that varying the feed rate had little effect on the content of toluene, ethyl toluene, dipentene or dimethyl styrene in the product. Doubling the feed rate, however, appears to increase the p-menthane content by about 4% at the expense of the cymene.

Example 3

In order to show the effect of temperature variation on the relative proportions of the products the procedure of Example 2 was repeated using a constant feed rate of about 15 cc./min. but using temperatures of 425°, 450° and 480° C. The results are shown in Table III.

Table III

| Temp., ° C. | Average product quality, per cent weight | | | | | |
|---|---|---|---|---|---|---|
| | Toluene | Ethyl toluene | Menthane | Dipentene | Cymene | Dimethylstyrene |
| 425 | 2.2 | 3.5 | 7.7 | 1.8 | 81.0 | 3.8 |
| 450 | 2.5 | 6.7 | 8.7 | 1.3 | 74.3 | 6.5 |
| 480 | 1.3 | 6.6 | 7.8 | 0.0 | 70.5 | 13.8 |

It will be noted that raising the temperature in this range had the following effects: (1) slightly increased the ethyl toluene content; (2) had little or no effect on p-menthane; (3) decreased the dipentene to a negligible value and (4) decreased the cymene by some 10%.

In developing the process of the present invention, it was found that some α,4-dimethyl styrene is usually formed as an extraneous side reaction product. However, α,4-dimethyl styrene is readily separable from the cymene and is itself an important commercial product. In many cases the cymene is subsequently converted to this product. Where this is done the presence of α,4-dimethyl styrene in the cymene is not objectionable and the two need not be separated. If so desired, the process of the present invention may be modified so that the direct conversion of the terpene to α,4-dimethyl styrene constitutes the principal product. This modified procedure, however, forms no part of the present invention but constitutes a part of the subject matter contained in my copending application Serial No. 491,939, filed June 23, 1943.

Some p-menthane is also usually present in the condensate. This fraction may be isolated and treated in any one of several ways. For example, it may be subjected to a separate dehydrogenation step by which a considerable proportion of the menthane may be converted to additional cymene and/or α,4-dimethyl styrene according to the process set forth in my copending application Serial No. 491,938, filed June 23, 1943. Or, if so desired, the menthane may be recycled with the feed in the process of the present invention. This treatment is fairly effective, particularly when the process is being operated within the upper limits of the permissible temperature range.

I claim:

1. A process of producing p-cymene which comprises vaporizing a monocyclic terpene at from about 200–300° C., pre-heating the vaporized material to approximately the dehydrogenation temperature and passing the pre-heated material over a catalyst mass comprising 2 to 15% $Cr_2O_3$ on alumina maintained at a temperature of from 400–550° C. and condensing the condensible portion of the reacted vapors.

2. A process according to claim 1 in which the monocyclic terpene comprises dipentene.

3. A process according to claim 1 in which the catalyst temperature is maintained between 450–500° C.

4. A process according to claim 1 in which the $Cr_2O_3$ is supported on an Activated Alumina support.

5. A process according to claim 1 in which the catalyst comprises $Cr_2O_3$ on "Activated" Alumina prepared by multiple deposition of a chromium-bearing material, capable of being converted to $Cr_2O_3$, the impregnated carrier being thoroughly dried between each impregnation.

6. A process of producing p-cymene which comprises passing a vaporized monocyclic terpene at dehydrogenation temperatures of from about 350–600° C. over a catalyst comprising 2 to 15% $Cr_2O_3$ supported on an alumina carrier.

7. A process of producing p-cymene which comprises passing a vaporized monocyclic terpene at dehydrogenation temperatures of from about 450–500° C. over a catalyst comprising 2 to 15% $Cr_2O_3$ supported on an alumina carrier.

JAMES KENNETH DIXON.